April 6, 1954 R. M. WILLIAMS 2,674,009

METHOD OF EMBEDDING MAGNETIC CUE MARKS IN FILMS

Filed May 7, 1951

INVENTOR.
RICHARD M. WILLIAMS
BY
Percy Freeman
ATTORNEY.

Patented Apr. 6, 1954 2,674,009

UNITED STATES PATENT OFFICE 2,674,009

METHOD OF EMBEDDING MAGNETIC CUE MARKS IN FILMS

Richard M. Williams, Porter Corners, N. Y., assignor to Cine-Devices, Inc., New York, N. Y.

Application May 7, 1951, Serial No. 224,866

1 Claim. (Cl. 18—59)

This invention relates to a magnetic cue mark for motion picture film.

It is customary to mark motion picture film with cues for the purpose of instituting an event or series of events when a predetermined point or points are reached during the course of travel of the film. For example, cue marks may be used to control intensity or variations in intensity of the printing light in film printing operations. Cue marks may also be used to produce electrical impulses, synchronized with the film, for operating signaling devices, sound effects, volume controls, projector starting, stopping and change-over devices, rewind controls and the like.

Cue marks of many types have been used. For example, notches have been cut into the edge of the film and feelers sensitive to said notches have been employed in starting the sequence of events. Cue marks of this type have been found wanting in many respects since they tend to weaken the film and the pick-up devices which have been used in association with them have not always been foolproof in operation. Magnetic clips and paint or electrical conducting clips or paint have been used as cue marks in place of the notches above-mentioned. But these cue marks have also suffered from constructional and operational defects and inadequacies. For example, it is difficult to apply them to the film. Furthermore, they project beyond the top and bottom or front or back surfaces of the film and thereby interfere with proper handling of the film. Moreover, they are themselves subject to mutilation or destruction or removal from the film during the course of the normal handling of the film and particularly during film cleaning operations and the like.

In principle, however, these magnetic cue marks perform well. They are used in conjunction with magnetic scanning heads, amplifiers, relays and other equally well known electrical apparatus. As the magnetic cue mark passes the magnetic scanning head, an electrical impulse is generated which is amplified by the amplifier to actuate a relay. The relay is connected in the usual manner to the apparatus which the cue mark is intended to put into operation.

It is the principal object of this invention to provide a magnetic cue mark which is embedded in the film in such manner as to avoid damage or injury to the film, and to prevent accidental displacement, removal or mutilation thereof during the course of normal handling of the film.

It is another object of this invention to provide a mechanical method of embedding said magnetic cue mark in the film.

More specifically, the magnetic cue mark herein claimed constitutes a microscopically thin metal disc having magnetic properties. It is thinner even than the film itself. In the process of embedding this magnetic disc in the film, the following steps are pursued: A hole of smaller diameter than the disc is punched into the film. The disc is then pressed into the film in concentric relation to the hole. Since the disc is larger than the hole, the effect is to distort the film material which immediately surrounds the hole to form a seat for the disc, on one side thereof. The material of the film which immediately surrounds the hole on the opposite side of the disc is then distorted to provide a second seat or shoulder for the disc, on said opposite side thereof. No part of the disc projects beyond either of the two flat surfaces of the film.

The magnetic disc is now embedded and locked securely in the film. It is exposed on both sides to the scanning head although this is not a critical requirement of the invention, since the film may be considered to be made of magnetically permeable material. Although a hole has been punched in the film to accommodate the disc, there is no measurable weakening in the film construction.

The invention is illustrated in the accompanying drawing, in which.

Figure 8:
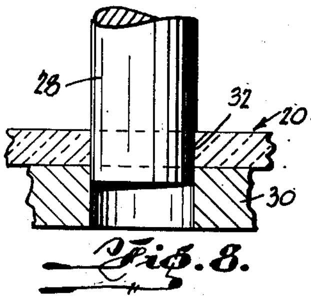
Fig. 8 is a section through a strip of film showing a hole punched therein by means of a punch press.
Figure 9:
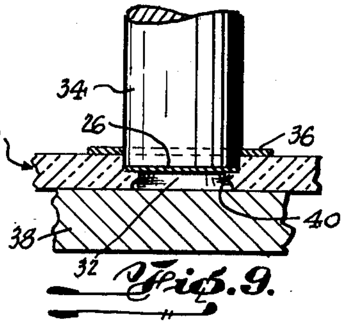
Fig. 9 is another sectional view showing a magnetic disc punched out of a sheet or strip of magnetic material and pressed into the film in concentric relation to the punched hole and thereby forming an annular seat for itself on one side.
Figure 10:
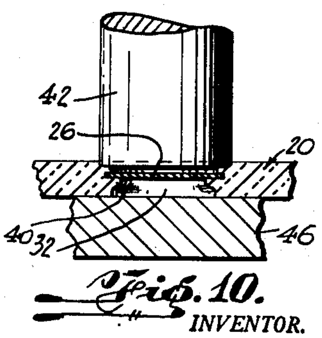

Fig. 10 is still another sectional view showing a punch distorting the film material which immediately surrounds the magnetic disc to form a seat for said magnetic disc on the opposite side thereof. The operation shown in Fig. 8 is performed cold but the operations shown in Figs. 9 and 10 are performed in the presence of sufficient heat to cause the film material to flow and to form the seats on both sides of the magnetic disc.

Figure 1:
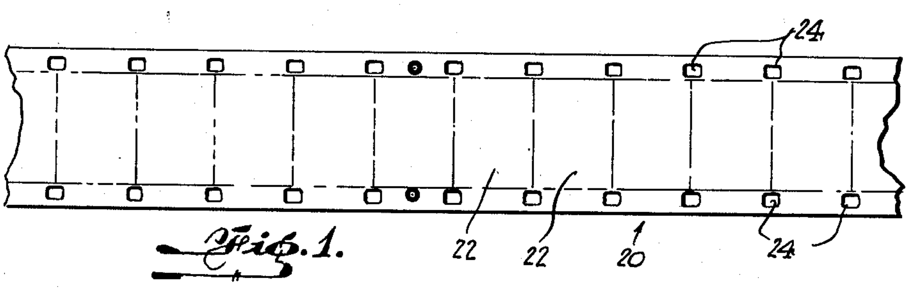
Fig. 1 is a plan view of a strip of film in which two magnetic cue marks herein claimed are embedded.
Figure 2:
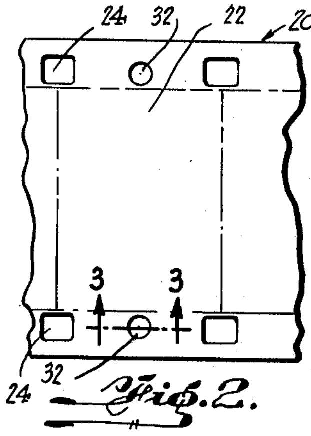
Fig. 2 is an enlarged fragment of a strip of film showing two holes punched marginally therein to receive a pair of magnetic cue marks.
Figure 3:
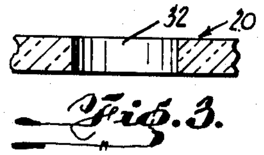
Fig. 3 is a sectional view on the line 3—3 of Fig. 2.

Film 20 shown in the drawing is a typical motion picture film from which printing is done or which is itself the final product employed in the production phase. It has a plurality of frames 22 and a plurality of sprocket holes 24. Figs. 2, 3 and 8 illustrate the first step in the process of embedding a magnetic cue mark such as magnetic disc 26 in the film. A cold punch 28 and a female disc 30 are employed to punch a hole 32 into the film, midway between a pair of adjacent sprocket holes 24. By way of illustration, this operation results in a hole .040 inch in diameter being punched into the film. A conventional punch press may be utilized in the performance of this operation.

Figure 4:
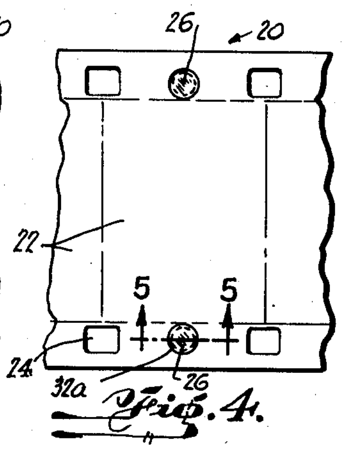
Fig. 4 is a view similar to that of Fig. 2, showing a pair of magnetic cue marks in the form of magnetic discs pressed into the film in concentric relation to the two punched holes.
Figure 5:
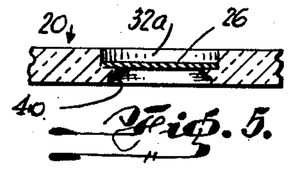
Fig. 5 is a section on the line 5—5 of Fig. 4, showing how a seat is formed in the film on one side of the magnetic discs when they are pressed into the film in concentric relation to the holes.

The second step in the process of embedding the magnetic disc in the body of the film is illustrated in Figs. 4, 5 and 9. It will there be seen that a second punch 34 is used to perform three operations. In the first place, punch 34 stamps magnetic disc 26 out of a strip or sheet of magnetic material 36. This strip or sheet of magnetic material is disposed flat upon the film and said film is disposed flat upon an anvil 38. Punch 34 is heated in conventional manner and its diameter slightly exceeds the diameter of punch 28. By way of illustration, punch 34 is .045 inch in diameter and consequently the magnetic disc 26 which it punches out of the strip or sheet 36 is also .045 inch in diameter. Punch 34 is axially aligned with hole 32 during the course of operation which is best shown in Fig. 9. Consequently, the magnetic disc 26 is formed in concentric relation to hole 32.

Punch 34 pushes magnetic disc 26 about halfway into the body of the film. The heat of the punch travels by conduction through the magnetic disc and into the material which comprises the film. There is sufficient heat to plasticize that portion of the film material which immediately surrounds hole 32 and to cause it to flow and form seat 40. Seat 40 is annular in shape and it results from the fact that punch 34 and magnetic disc 26 are too large to enter hole 32 without pushing the hole wall downwardly as viewed in Fig. 9.

Figure 6:
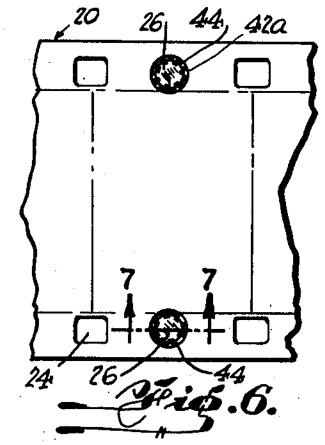
Fig. 6 is another view similar to that of Fig. 2 showing how the opposite side of the two magnetic discs is secured to the film, namely by means of seats formed on said opposite side of the two discs in the film material.
Figure 7:
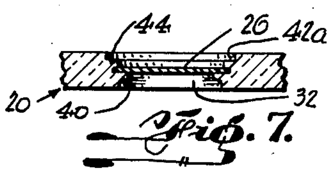
Fig. 7 is a sectional view on the line 7—7 of Fig. 6, showing one of the discs embedded in the film and a seat on each side of the disc locking the same in the film.

Figs. 6, 7 and 10 illustrate the third step in the process of embedding the magnetic disc in the body of the film. A third punch 42, also heated, and slightly larger in diameter than punch 34 is employed in the performance of this step. As an illustration of its diameter, punch 42 has a diameter of .050 inch. The movement of punch 42, like the movement of punch 34, is coaxial with hole 32. It engages that peripheral portion of the film material which immediately surrounds the enlarged portion 32$a$ of hole 32 which punch 34 and magnetic disc 26 formed in the second step of the process. The heat of punch 42 plasticizes the film material sufficiently to cause it to flow and to form shoulder 44 on the opposite side of the magnetic disc from seat 40, thus forming a still larger recess 42$a$. Like seat 40, seat 44 is annular in shape. In this stroke of punch 42, there is a downward movement into the body of the film, as viewed in Fig. 10, to the extent of about one-sixth of the thickness. Bearing in mind that the magnetic disc is punched out of magnetic sheet material which is about .001 inch thick, it will be understood that these depth figures are only approximate. What is important, is that the strip of film has a greater thickness than .001 inch and that enough material is left over on both sides of the magnetic disc to form seats 40 and 44. It will be understood that an anvil 46 supports the film in the third step of the process above-described.

The foregoing is illustrative of the basic principles of the invention, and it will be understood that modifications may be incorporated both into the process and into the product within a broad spirit of the invention and scope of the claim. For example, the dimensions and proportions above mentioned are purely illustrative and other proportions and dimensions may be employed as and when desired. Similarly, the shape of the magnetic cue mark may be varied and it should not be understood that this invention is limited to a cue mark of disc shape. However, a disc-shaped cue mark is preferred.

Having thus described my invention, what I claim as new and desire to secure by Letters Patent, is:

A method of embedding a magnetic cue mark in a strip of motion picture film, comprising the following steps: punching a hole in a strip of film, marginally thereof, inserting a magnetic cue mark into the hole under pressure and in the presence of heat sufficient to plasticize the film in the peripheral area immediately surrounding the hole, said cue mark having a thickness which is exceeded by the axial length of the hole and having a cross-sectional uniform dimension which exceeds the diameter of the hole, whereby the pressure of the peripheral edge of the cue mark acting upon the plasticized peripheral area of the film causes said plasticized area to flow and to form an annular seat on one side of said cue mark, and finally pressing the peripheral edge of the hole in the film on the opposite side of the cue mark in the presence of heat sufficient to cause said last-mentioned plasticized area to flow and to form a second seat corresponding to the first seat on the opposite side of the cue mark, thereby anchoring said cue mark in said hole and preventing dislodgment thereof.

References Cited in the file of this patent

UNITED STATES PATENTS

| Number | Name | Date |
|---|---|---|
| 530,817 | Aumont | Dec. 11, 1894 |
| 539,719 | Bechtold | May 21, 1895 |
| 772,647 | Edison | Oct. 18, 1904 |
| 956,485 | Conklin | Apr. 26, 1910 |
| 1,334,948 | Ewing | Mar. 30, 1920 |
| 1,981,334 | Schmalz | Nov. 20, 1934 |
| 2,247,558 | Nichols | July 1, 1941 |
| 2,431,238 | Friedman | Nov. 18, 1947 |
| 2,473,468 | Cooley | June 14, 1949 |
| 2,569,228 | Clark et al. | Sept. 25, 1951 |

FOREIGN PATENTS

| Number | Country | Date |
|---|---|---|
| 222,940 | Great Britain | Oct. 9, 1924 |
| 602,035 | Great Britain | May 19, 1945 |